United States Patent [19]

El-Hibri

[11] Patent Number: 5,905,120

[45] Date of Patent: May 18, 1999

[54] POLYETHERIMIDE COMPOSITIONS HAVING IMPROVED ENVIRONMENTAL STRESS-CRACK RESISTANCE

[76] Inventor: M. Jamal El-Hibri, 6851 Roswell Rd., NE., #M-18, Atlanta, Ga. 30328

[21] Appl. No.: 08/991,276

[22] Filed: Dec. 16, 1997

[51] Int. Cl.⁶ .............................. C08L 69/00; C08L 79/08
[52] U.S. Cl. .............................. 525/419; 525/66; 525/67; 525/425; 525/431; 525/433; 525/436
[58] Field of Search ................................ 525/66, 419, 67, 525/425, 431, 433, 436

[56] References Cited

U.S. PATENT DOCUMENTS

| | | | |
|---|---|---|---|
| 4,629,759 | 12/1986 | Rock | 525/66 |
| 4,673,708 | 6/1987 | Rock et al. | 525/66 |
| 4,855,356 | 8/1989 | Holub et al. | 525/66 |
| 5,051,483 | 9/1991 | Rock et al. | 525/425 |

*Primary Examiner*—P. Hampton-Hightower
*Attorney, Agent, or Firm*—Richard J. Schlott; Thomas E. Nemo; Stephen L. Hensley

[57] ABSTRACT

Blends containing a polyetherimide and from about 8 to about 20 wt. % of a modifier formulation comprising an acrylate rubber and a polycarbonate, and a method for improving the ESCR properties of polyetherimides.

9 Claims, No Drawings

POLYETHERIMIDE COMPOSITIONS HAVING IMPROVED ENVIRONMENTAL STRESS-CRACK RESISTANCE

BACKGROUND OF THE INVENTION

This invention relates to polyetherimides, and more particularly to polyetherimide compositions having improved stress-crack resistance. Still more particularly, the polyetherimide compositions of this invention are polymer blends containing, in addition to a polyetherimide, an acrylate core-shell type rubber and a polycarbonate. These blends are characterized by remarkably improved environmental stress-crack resistance and an excellent balance of mechanical properties.

Polyetherimides are widely accepted for use because of their good strength properties at elevated temperatures, electrical properties, and for their heat resistance. Even though these resins are resistant to a wide range of chemicals, they are susceptible to crazing and stress cracking when exposed to solvents and fluids commonly encountered in coating, electronic and automotive applications. Polyetherimides also are somewhat lacking in impact strength and ductility; when molded parts encounter such solvents they may become crazed or stress-cracked and subject to catastrophic failure in use.

Improvement in environmental stress-crack resistance thus becomes needed for better performance of articles fabricated from polyetherimides, particularly for use in applications such as automotive and electrical parts where the articles may be subject to attack by solvents and fluids. Of course, it is also important that such improvement be achieved without substantial adverse effects on desirable properties of the polyetherimide. The acceptance of polyetherimides for many applications over other resins by the compounding art depends on the resin's excellent dimensional stability at elevated temperatures. Methods for increasing resin environmental stress-crack resistance at the expense of impact strength and rigidity at elevated temperatures would likely not be readily adopted by the industry.

A variety of impact modifiers are known for use with thermoplastics. Generally, these modifiers are rubbery compositions that can be blended or incorporated into the thermoplastics. Very few rubbery modifiers have been found to be effective for improving impact in polyetherimide resins, and many of those that do often cause adverse affects, including losses in other key properties.

Ternary blends of polyetherimides with polycarbonates and acrylic rubber interpolymers are known in the art and have been shown to have improved impact strength. For example, in U.S. Pat. No. 4,673,708, there are disclosed blends comprising from about 25 to about 33 wt. % of the polycarbonate component based on the total weight of the blend, together with minor amounts of the rubber component. Although the blends are disclosed to have improved impact strength, little improvement is shown by the reference for ternary blends containing less than 30 wt. % polycarbonate.

Thus, there continues to be a need for high temperature thermoplastic polyetherimides with improved resistance to environmental stress cracking, and for a method to improve the environmental stress cracking resistance of polyetherimides without substantially reducing the desirable balance of mechanical properties that characterize these resins.

BRIEF SUMMARY OF THE INVENTION

The polyetherimide compositions of this invention are polymer blends containing, in addition to a polyetherimide, an acrylate core-shell type rubber and a polycarbonate. The invented compositions exhibit substantial improvement in environmental stress-crack resistance, while retaining thermal and mechanical properties characteristic of polyetherimides. This invention may also be characterized as a method for improving the environmental stress-crack resistance of polyetherimides.

DETAILED DESCRIPTION OF THE INVENTION

The polyetherimides suitable for use in this invention are well known in the art and are described in, for example, U.S. Pat. Nos. 3,847,867, 3,838,097 and 4,107,147.

The polyetherimides comprise units of the following structure:

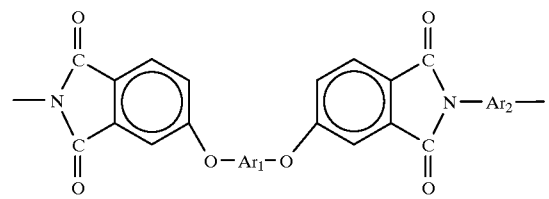

wherein $Ar_1$ and $Ar_2$ are independently selected from substituted and unsubstituted divalent aromatic radicals and, more particularly, may be monoarylene moieties such as p-phenylene, m-phenylene or the like, or selected from diarylene moieties such as, for example, a biphenyl, bisphenol A, bisphenol S or similar moiety. Isomeric structures wherein the ether-linked moiety —O—$Ar_1$—O— may be attached to the 3 and 3' positions of the respective aromatic rings are also contemplated as within the description of suitable polyetherimides.

These polyetherimides are readily prepared by any of the methods well known in the art such as those disclosed in, for example, U.S. Pat. Nos. 3,833,544, 3,887,588, 4,017,511, 3,965,125 and 4,024,110. Generally, suitable polyetherimides may be made by the reaction of an aromatic bis(ether anhydride) with one or more aromatic diamines selected from m-phenylene diamine, p-phenylene diamine. a diaminodiphenyl ether, a diaminodiphenyl sulfone, a diaminodiphenyl ketone, an aryl-aliphatic diamine such as bis-(4-aminophenyl) methane, 2,2-bis-(4-aminophenyl) propane or the like.

Also useful in the practice of this invention are the corresponding copolymers wherein up to 50 mole %, preferably no more than 25 mole % of the anhydride units are derived from aromatic dianhydrides such as benzene tetracarboxylic acid dianhydride, benzophenone tetracarboxylic acid dianhydride, dipheny lether tetracarboxylic acid dianhydride, naphthalene tetracarboxylic acid dianhydride, or the like. Suitable polyetherimides are available from commercial sources. Those containing units derived from 2,2-bis(4-(2,3-dicarboxyphenoxy)phenyl)-propane dianhydride and m-phenylenediamine having the structural formula:

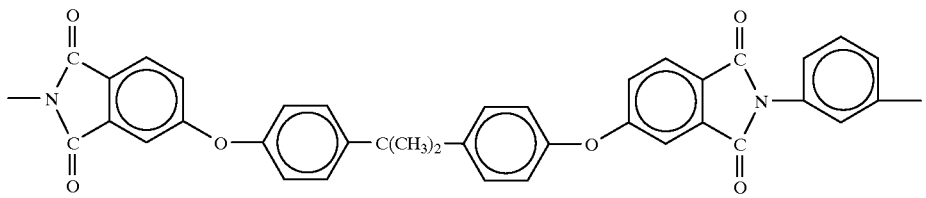

are available from GE Plastics Company under the tradename Ultem® 1000 polyetherimide resin. Also available commercially from the same source are polyetherimide copolymers such as Ultem® 6000 polyetherimide resin.

Generally, polyetherimides useful in the practice of the invention will have a reduced viscosity greater than 0.2 dl/g, preferably 0.35 to 0.7 deciliters per gram when measured in m-cresol at 25° C. Although resins with a reduced viscosity as great as 1.2 dl/g may be found useful, the higher viscosity resins are generally very difficult to process and thus will be less preferred.

The acrylate core-shell type rubber suitable for use in the practice of the invention will generally comprise from about 50 to 95 percent by weight of a first elastomeric phase and about 50 to 5 percent by weight of a rigid thermoplastic second phase. The first phase is polymerized from about 75 to 99.8 percent by weight $C_1$ to $C_6$ acrylate, resulting in an acrylate rubber core which is crosslinked with about 0.1 to 5 percent by weight of a suitable cross-linking monomer to which is added about 0.1 to 5 percent by weight of a graft-linking monomer.

Suitable alkyl acrylates include methyl acrylate, ethyl acrylate, isobutyl acrylate and n-butyl acrylate. The preferred acrylate is n-butyl acrylate. Suitable crosslinking monomers include polyacrylic and polymethacrylic esters of polyols such as butylene diacrylate and dimethacrylate, trimethylol propane trimethacrylate and the like, di- and trivinyl benzene, vinyl acrylate and methacrylate, and the like. The preferred cross-linking monomer is butylene diacrylate.

The graft-linking monomer provides a residual level of unsaturation in the elastomeric phase, particularly in the latter stages of polymerization and, consequently, at or near the surface of the elastomeric particle. The preferred graft-linking monomers are alkyl methacrylate and dialkyl maleate. The rigid thermoplastic phase may be comprised of $C_1$ to $C_{16}$ methacrylate, styrene, acrylonitrile, alkyl acrylates, alkyl methacrylate, dialkyl methacrylate and the like. Preferably, this phase is at least about 50 wt. % $C_1$ to $C_4$ alkyl methacrylate.

Methacrylate-butadiene-styrene (MBS) core shell graft copolymers formed from a rubber-elastic core comprising polybutadiene and a hard graft shell are also disclosed in the art, alone and in combination with particular stabilizer formulations, as impact modifiers for a variety of thermoplastics. The preparation of acrylate graft copolymers is well described in the art. Acrylate rubber modifiers suitable for use in compositions of this invention are available commercially, including an acrylate rubber modifier obtainable from Rohm & Haas Corporation, Philadelphia, Pa. under the tradename Paraloid® EXL-3361.

Polycarbonates suitable for use in the practice of the invention are high molecular weight, thermoplastic, aromatic polycarbonates, including homopolycarbonates, copolycarbonates and copolyestercarbonates and mixtures thereof, which have average molecular weights of about 8,000 to more than 200,000, preferably of about 20,000 to 80,000, and an I.V. of 0.40 to 1.0 dl/g as measured in methylene chloride at 25° C.

The polycarbonates may be conveniently derived from dihydric phenols and carbonate precursors. Typical of the dihydric phenols suitable for use in producing polycarbonates are 2,2-bis(4-hydroxyphenyl)propane (Bisphenol A), bis(4-hydroxyphenyl)methane, 2,2-bis(4-hydroxy-3-methylphenyl)propane, 4,4- bis(4-hydroxyphenyl)heptane, 2,2-(3,5,3',5'-tetrachloro-4,4'-dihydroxyphenyl) propane, 2,2-(3,5,3',5'-tetrabromo-4,4'-dihydroxphenyl)-propane, and 3,3'-dichloro-4,4'-dihydroxydiphenyl methane. Other suitable dihydric phenols are also available, including those disclosed in U.S. Pat. Nos. 2,999,835, 3,038,365, 3,334,154, and 4,131,575. The carbonate precursor employed may be a carbonyl halide such as phosgene, a carbonate ester or a haloformate.

The polycarbonates may be manufactured by a variety of widely known processes such as, for example, by reacting a dihydric phenol with a carbonate precursor such as diphenyl carbonate or phosgene in accordance with methods set forth in the above-cited literature and in U.S. Pat. No. 4,018,750 and 4,123,436, or by transesterification processes such as are disclosed in the U.S. Pat. No. 3,153,008, as well as other processes known to those skilled in the art.

Suitable polycarbonate resins are also readily available from a variety of commercial sources, including poly (Bisphenol A carbonate) resins available as Lexan® polycarbonate resins from the General Electric Company. and Makrolon® polycarbonate resins from Bayer Corporation.

The high stress-crack resistant compositions of this invention will comprise from about 70 to about 92 wt. % polyetherimide and from about 30 to about 8 wt. % of the modifying combination of polycarbonate and acrylate rubber. In accordance with the present invention, the polycarbonate component and the acrylate rubber will be present in the composition in a weight ratio of from about 5:1 to about 1:1.

Stated in terms of the total of weight of the three resin components, the polyetherimide compositions of this invention will comprise from about 70 to about 92 wt. % polyetherimide, from about 20 to about 5 wt. % polycarbonate, and from about 3 to about 10 wt. %, preferably about 3 to about 7 wt. % acrylate core-shell type rubber.

The polyetherimide compositions of the present invention may be further compounded to include up to about 60 wt. % of various additives to improve or modify various chemical and physical properties. Examples of such additives include flame retardants, anti-oxidants, light stabilizers, processing aids, colorants, fillers and reinforcing agents. Suitable as reinforcing agents are glass fibers and carbon fibers including graphitic fibers. Metal fibers, alumina and aluminum silicate fibers, aluminum oxide fibers, rock wool fibers and the like may also be found useful for particular applications. Representative filler materials include particulate and powdered forms of calcium silicate, silica, clays, talc, mica, carbon black, titanium dioxide, wollastonite, polytetrafluoroethylene, graphite, alumina trihydrate, sodium aluminum carbonate, baryte and the like. The appropriate types and levels of such additives will depend on processing techniques and on the end use of the resultant product, and can be determined by those skilled in the art.

The polyetherimide compositions according to this invention may be compounded using any of the variety of compounding and blending methods well-known and commonly used in the resin compounding arts. Conveniently, the polyetherimide and modifying components, in powder, pellet, or other suitable form, may be melt compounded at temperatures effective to render the resinous components molten using a high shear mixer, e.g., a twin-screw extruder, to obtain a desirably uniform blend. The components may first be combined in solid form, such as powder or pellets, prior to melt compounding to facilitate mixing. Particulates, fibers and other additives may be incorporated into one or more of the components prior to combining with the remaining components, or the components may be physically mixed in powder or pellet form using conventional dry-blending methods and then extrusion compounded. Plasticating the resin in a compounding extruder and feeding the additives, particulates or fibers to the molten composition through a port in the extruder, as is also commonly practiced in the art, may be found useful in compounding the compositions of this invention.

The invented high impact strength polyetherimide compositions may be injection molded, or fabricated to form film, sheets or other forms using any of a variety of processes and methods well-known and widely practiced in the fabricating arts, e.g. melt extrusion of sheets, film, tubing or profile. The compositions may also be used as matrix materials or binders for composite or laminated structures and, when further compounded with from 5 to 60 wt. % of one or more reinforcing fillers such as glass fiber or carbon fiber or the like as well as with fillers such as clay, talc and mineral fillers and the like, may be found particularly desirable in molded goods intended for use in extreme environments.

The invented compositions have application in a wide variety of physical shapes and forms including films, molded goods and extruded products. When used as films or when made into molded or extruded products, these blends, including filled and laminated products prepared therefrom, not only possess good physical properties and excellent chemical resistance at room temperature, but they retain their strength and good performance at elevated temperatures for long periods of time. Films and molded articles formed from the polyetherimide composition of this invention may be particularly useful in automotive and electrical applications where resistance to solvents, mechanical fluids and coatings solvents may be important, in durable goods and appliances, medical and plumbing applications where resistance to hot, humid environments may be particularly important, and safety equipment and protective gear.

The invention will be better understood by way of consideration of the following illustrative examples and comparison examples. which are provided by way of illustration and not in limitation thereof. In the examples, all parts and percentages are by weight unless otherwise specified.

EXAMPLES

The resin components employed in the examples include:

| | |
|---|---|
| PEI-I | Unmodified polyetherimide molding grade resin obtained as Ultem 1000 polyetherimide resin from GE Plastics Company; disclosed as derived from 2,2-bis(4-(2,3-dicarboxyphenoxy)phenyl)-propane dianhydride and m-phenylenediamine. |
| PEI-II | Unmodified polyetherimide high flow molding grade resin obtained as Ultem 1010 polyetherimide resin from GE Plastics Company; disclosed as derived from 2,2-bis(4-(2,3-dicarboxyphenoxy)phenyl)-propane dianhydride and m-phenylenediamine. |
| P'carbonate: | Poly(Bisphenol A carbonate), obtained as Lexan Bisphenol A polycarbonate resin from GE Plastics Company. |
| Rubber: | Acrylate core-shell type rubber, obtained as Paraloid EXL-3361 Acrylate graft copolymer rubber modifier from Rohm and Haas Corporation. |

Compounding was accomplished by dry-blending dried resin with the additives and feeding the blend to a 25 mm Berstorff co-rotating, partially intermeshing twin screw extruder. The compounded polymer was extruded through a strand die into water, then chopped to form pellets. The various components as well as the parts thereof in each of the blends, are indicated in Table 1 below. The compositions also contained 0.1 wt. % Irganox 1010 thermal stabilizer from Ciba Geigy Company.

The blends were injection molded to provide test specimens generally by using an Arburg injection molding machine operated at barrel temperatures of 299° C. in a first zone, 310° C. in a second zone and 310° C. in a final zone. Mold temperature was 121° C. The mechanical properties are room temperature properties unless otherwise indicated, and were determined according to ASTM published procedures D-638 (tensile properties), D-790 (flexural properties) and D-256 (notched Izod impact) unless otherwise noted. The heat deflection properties were determined on unannealed samples by ASTM D-648.

There are no standardized test methods for determining environmental stress-crack resistance of plastics generally. The interaction of load or strain with chemical environment has a profound effect on plastics, and a number of non-standard test methods have been reported for the purpose of providing a basis for environmental stress-crack resistance comparison. One test method in common use provides for bending the molded bar around curved forms of varying radii, to provide measurements of threshold or critical strain which marks the onset of failure. The test method employed for evaluating the compositions of this invention and comparative compositions were Type I ASTM tensile bars of 0.125" thickness and 0.5" wide in the gauge section. Brass flexural jigs of different outer radii were used to generate strains ranging from 0.14 to 0.83% on 0.125" thick specimens. The strain, "∈", is calculated from simple beam geometry according to the following equation, $$\in = t/2r$$

where t is the specimen thickness (0.125") and r is the outer radius of curvature of the jig. For relatively low strains—as is the case here—tensile stress at the so-called "outer fiber" of the specimen. "σ". can be computed as $$\sigma = E\in$$

where E is the material tensile modulus. Since the three resin formulations examined had nearly equivalent moduli (within ±5%) a single modulus, 487 Kpsi, which is the average of the three materials, was used in all calculations. The different flex jigs used had the radii shown, below along with the corresponding strains and stresses produced by using these fixtures.

| Jig Radius (in) | Induced Strain (%) | Induced Stress (psi) |
|---|---|---|
| 7.50 | 0.83 | 4040 |
| 9.00 | 0.69 | 3380 |
| 11.25 | 0.55 | 2680 |
| 15.00 | 0.42 | 2030 |
| 22.50 | 0.28 | 1360 |
| 45.00 | 0.14 | 680 |

To perform the test, the tensile specimens were first mounted on the jigs of different radii using rubber hose shut off clamps, then immersed in a tub containing each of the following solvents: isopropanol, 1,1,1-trichloroethane, ethyl acetate, toluene, and methyl ethyl ketone at room temperature (23° C.). The specimens were exposed to the solvents for a duration of 15 minutes after which they were removed and inspected for crazing, cracking, surface etching, or any other signs of physical or mechanical failure.

For comparison purposes, comparative formulations C-1 through C-4 comprising the polyetherimide alone and the polyetherimide in combination with the acrylate rubber modifier alone were prepared. molded and tested following the same procedures.

TABLE 1

| Example | | 1 | C-1 | C-2 | 2 | C-3 | C-4 |
|---|---|---|---|---|---|---|---|
| PEI-I | pbw | — | — | — | 80 | 95 | 100 |
| PEI-II | | 80 | 95 | 100 | — | — | — |
| P'carbonate | pbw | 15 | — | — | 15 | — | — |
| Rubber | pbw | 5 | 5 | — | 5 | 5 | — |
| P'carbonate/ rubber wt. ratio | | 3:1 | — | — | 3:1 | — | — |

Notes: 1. For components, abbreviations, see text.

The results of the environmental stress-crack resistance testing of the invented compositions and of the comparison compositions are summarized in the following Tables 2a through 2e.

TABLE 2(a)

TCE (1,1,1-trichloroethane)

| Strain (%) | Stress (psi) | C-1 | C-2 | 1 |
|---|---|---|---|---|
| 0.83 | 4040 | Rupture | Rupture | No Effect |
| 0.69 | 3380 | Rupture | No Effect | No Effect |
| 0.55 | 2680 | No Effect | No Effect | No Effect |

Notes: 1. For components, abbreviations, see text.

TABLE 2(b)

Ethyl Acetate

| Strain (%) | Stress (psi) | C-1 | C-2 | 1 |
|---|---|---|---|---|
| 0.83 | 4040 | Rupture | Crazing | Sl. Crazing |
| 0.69 | 3380 | — | — | No Effect |
| 0.55 | 2680 | Rupture | Sl. Crazing | No Effect |

TABLE 2(b)-continued

Ethyl Acetate

| Strain (%) | Stress (psi) | C-1 | C-2 | 1 |
|---|---|---|---|---|
| 0.42 | 2030 | Rupture | No Effect | No Effect |
| 0.28 | 1360 | No Effect | — | — |

Notes: 1. For components, abbreviations, see text.

TABLE 2(c)

Toluene

| Strain (%) | Stress (psi) | C-1 | C-2 | 1 |
|---|---|---|---|---|
| 0.83 | 4040 | Rupture | Rupture | Crazing |
| 0.69 | 3380 | — | — | Sl. Crazing |
| 0.55 | 2680 | Rupture | Rupture | No Effect |
| 0.42 | 2030 | Rupture | No Effect | No Effect |
| 0.28 | 1360 | No Effect | — | — |

Notes: 1. For components, abbreviations, see text.

TABLE 2(d)

Methyl Ethyl Ketone

| Strain (%) | Stress (psi) | C-1 | C-2 | 1 |
|---|---|---|---|---|
| 0.83 | 4040 | Rupture | Rupture | Crazing |
| 0.55 | 2680 | Rupture | Rupture | Sl. Crazing |
| 0.42 | 2030 | Rupture | No Effect | No Effect |
| 0.28 | 1360 | Crazing | No Effect | No Effect |
| 0.14 | 680 | No Effect | — | — |

Notes: 1. For components, abbreviations, see text.

TABLE 2(e)

Isopropanol

| Strain (%) | Stress (psi) | C-1 | C-2 | 1 |
|---|---|---|---|---|
| 0.83 | 4040 | No Effect | No Effect | No Effect |

Notes: 1. For components, abbreviations, see text.

The environmental stress-crack resistance of plastics may be conveniently summarized as the Critical Strain and Critical Stress Thresholds for particular solvents, i.e. as the strain or stress threshold at which failure occurs. The Critical Strain Thresholds for the invented formulations in the five solvents is summarized in the following Table 3a, and the Critical Stress Thresholds in following Table 3b.

TABLE 3a

Critical Strain Threshold (%)

| Solvent | Data Table | C-1 | C-2 | 1 |
|---|---|---|---|---|
| 1,1,1-trichloroethane | 2a | 0.55 | 0.69 | >0.83 |
| Ethyl Acetate | 2b | 0.28 | 0.42 | 0.69 |
| Toluene | 2c | 0.28 | 0.42 | 0.55 |
| Methyl Ethyl Ketone | 2d | 0.14 | 0.42 | 0.42 |
| Isopropanol | 2e | >0.83 | >0.83 | >0.83 |

TABLE 3b

Critical Stress Threshold (psi)

| Solvent | Data Table | C-1 | C-2 | 1 |
|---|---|---|---|---|
| 1,1,1-trichloroethane | 2a | 2680 | 3360 | >4040 |
| Ethyl Acetate | 2b | 1360 | 2030 | 3380 |
| Toluene | 2c | 1360 | 2030 | 2680 |
| Methyl Ethyl Ketone | 2d | 680 | 2030 | 2030 |
| Isopropanol | 2e | >4040 | >4040 | >4040 |

Note: Samples were not tested at stresses higher than 4,040 psi.

It will be apparent from a consideration of the ESCR data presented in Tables 3a and 3b that for exposure to aggressive solvents commonly encountered in the coatings and electrical industries the polyetherimide composition according to the invention, Example 1, is markedly improved in ESCR properties over polyetherimide alone, Comparative Example C-1. Also see Tables 2a–2d. Isopropanol, known in the art to be without effect on polyetherimides, also does not affect polyetherimide composition. See Table 2e.

The mechanical properties of the polyetherimide formulations according to the invention are summarized in the following Table 4.

TABLE 4

Mechanical Properties

| | | Example: | | | | | |
|---|---|---|---|---|---|---|---|
| | | 1 | C-1 | C-2 | 2 | C-3 | C-4 |
| Tensile Str. | psi | 14,400 | 15,800 | 17,400 | 12,300 | 14,900 | 17,300 |
| Tensile Str. (anneal'd) | psi | 14,600 | 16,600 | 18,200 | 10,900 | 14,100 | 18,100 |
| Tensile Mod. | Kpsi | 463 | 486 | 513 | 435 | 484 | 499 |
| Tensile Mod. (anneal'd) | Kpsi | 459 | 494 | 518 | 438 | 501 | 27 |
| Elongation | % | 25 | 17 | 14 | 4.5 | 5.3 | 22 |
| Elongation (anneal'd) | % | 24 | 9.7 | 8.5 | 3.6 | 4.6 | 8.5 |
| Flex. Str. | psi | 21,300 | 23,900 | 26,400 | 20,200 | 23,600 | 26,000 |
| Flex. Mod. | Kpsi | 436 | 478 | 508 | 420 | 478 | 502 |
| Notched Izod | * | 2.1 | 1.4 | 0.4 | 1.2 | 1.4 | 0.6 |
| Unnotched Izod | | 60 | 53 | 18 | 43 | 19 | 32 |

Notes: 1. For compositions see Table 1; 2. For testing methods, see text. Tensile Str. = ultimate tensile strength; Elongation is at break; * units are ft.-lb/in notch; anneal'd = molded bar annealed 1 hr. at 200° C.

It will be readily apparent from consideration of the mechanical properties summarized in Table 4 that the polyetherimide formulations of Examples 1 and 2 are toughened, retaining an excellent balance of mechanical properties in addition to the significant improvement in environmental stress-crack resistance. The excellent flexural strength and rigidity that characterize polyetherimides, see C-2 and C-4, are retained in the ternary blends of Examples 1 and 2.

Although there is a reduction in mechanical properties, it will also be apparent that the improvement in ESCR for the invented compositions is obtained while maintaining a useful balance in overall mechanical properties. The retention of tensile properties and particularly the maintaining of a high tensile elongation-at-break value after annealing is surprising, and would not be expected for amorphous, high temperature engineering resins. See Example 1.

Tough, rigid thermoplastic resins with a high tensile elongation after annealing, at least 20%, is a highly desirable resin characteristic, making the resin particularly attractive for food service applications.

It will also be seen from a comparison of the formulation based on a high melt flow polyetherimide resin, Example 1, with a formulation based on a low melt flow resin, Example 2, that it may be beneficial for many applications to employ high melt-flow polyetherimides in formulations according to this invention. The lower melt flow polyetherimide employed in Example 2 resulted in a somewhat higher brittleness compared with the neat resin, Comparative Example C-4, and the mechanical properties were more detrimentally affected. Poor dispersion of the modifier components into the polyetherimide resulted, largely due to the difficulty in melt-processing mixtures containing both high melt flow modifiers and low melt flow resins.

The invention will thus be seen to be directed to polyetherimide compositions having improved ESCR characteristics, and to a method for improving the ESCR properties of polyetherimides. The invented polyetherimide compositions comprise from about 80 to about 92 wt. % polyetherimide and from about 8 to about 20 wt. % of a mixture containing a thermoplastic aromatic polycarbonate and an acrylate rubber in a polycarbonate:acrylate rubber weight ratio of from about 5:1 to about 1:1. The invented compositions may also be described as containing from about 80 to about 92 wt. % polyetherimide, from about 8 to about 3 wt. % polycarbonate and from about 3 to about 10 wt. % acrylate rubber.

Characterized as a method for improving the ESCR properties of polyetherimide resins, the invented method comprises compounding the polyetherimide with up to 20 wt. %, preferably from about 5 to about 20 wt. % based on total resin components, of a composition comprising a thermoplastic aromatic polycarbonate and an acrylate rubber in a weight ratio of from about 5:1 to about 1:1.

Although the invention has been described and illustrated by way of specific embodiments set forth herein, those skilled in the art will recognize that alternative acrylate rubber modifiers, polycarbonates and polyetherimides within the description of the invention are available or may be readily obtained and used. Still further modifications and variations will be readily apparent to those skilled in the resin formulating and composite fabricating art, and such variations and modifications will be understood to lie within the scope of the invention as defined by the appended claims.

I claim:

1. The composition comprising from about 80 to about 92 wt. % polyetherimide, from about 20 to about 5 wt. % of a thermoplastic aromatic polycarbonate and from about 3 to about 7 wt. % of an acrylate core-shell rubber.

2. The composition of claim 1 wherein said polyetherimide comprises structural units represented by the structural formula:

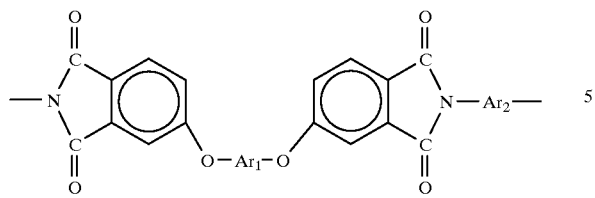

wherein $Ar_1$ and $Ar_2$ are independently selected from substituted and unsubstituted divalent aromatic radicals.

3. The composition of claim 1 wherein the polyetherimide contains structural units represented by the formula

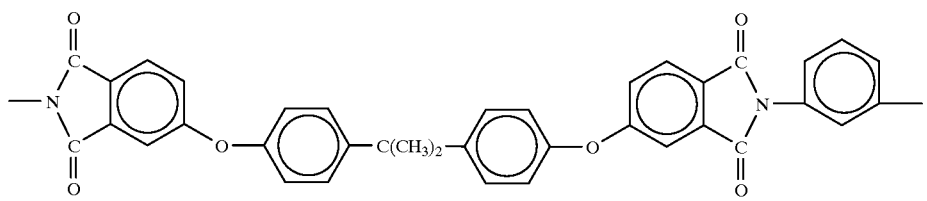

4. The composition of claim 1 wherein the polycarbonate is poly(Bisphenol A carbonate).

5. A method for improving the environmental stress-crack resistance of a polyetherimide, said method comprising the steps of forming a blend of said polyetheriide with a thermoplastic aromatic polycarbonate and an acrylate core-shell rubber in a weight ratio of polycarbonate: acrylate rubber of from about 5:1 to about 1:1 to from a blend, and molding the blend.

6. The method of claim 5 wherein the polycarbonate is poly(Bisphenol A carbonate).

7. The method of claim 5 wherein the combined weight of polycarbonate and acrylate rubber comprises from about 20 to about 8 wt. % of said blend, based on total weight of resin components.

8. The method of claim 5 wherein said acrylate core-shell rubber comprises from about 25 to 95 percent by weight of an elastomeric first phase polymerized from about 75 to 99.8 percent by weight $C_1$ to $C_6$ alkyl acrylate, 0.1 to 5 percent by weight of a cross-linking monomer and about 0.1 to 5 percent by weight of a graft-linking monomer, and about 75 to about 5 percent by weight of a thermoplastic second phase.

9. The method of claim 5 wherein the polyetherimide contains structural units represented by the formula

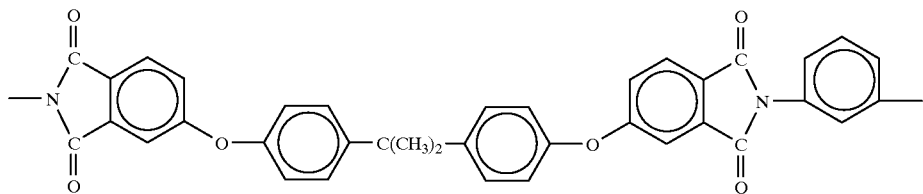

* * * * *

UNITED STATES PATENT AND TRADEMARK OFFICE
CERTIFICATE OF CORRECTION

PATENT NO.: 5,905,120
DATED: May 18, 1999
INVENTOR(S): M. Jamal El-Hibri

It is certified that error appears in the above-identified patent and that said Letters Patent is hereby corrected as shown below:

| Col. | Line | |
|---|---|---|
| 1 | 49 | "U.S. Pat. No. 4.673,708, there"<br><br>should read:<br>"U.S. patent 4,673,708, there" |
| 2 | 61 | "dipheny lether"<br><br>should read:<br>"diphenylether" |
| 4 | 18 | ",4'-dihydroxphenyl)-propane,"<br><br>should read:<br>",4'-dihydroxyphenyl)-propane," |
| 4 | 35 | "General Electric Company. and"<br><br>should read:<br>"General Electric Company, and" |

UNITED STATES PATENT AND TRADEMARK OFFICE
CERTIFICATE OF CORRECTION

PATENT NO.: 5,905,120
DATED: May 18, 1999
INVENTOR(S): M. Jamal El-Hibri

It is certified that error appears in the above-identified patent and that said Letters Patent is hereby corrected as shown below:

| Col. | Line | |
|---|---|---|
| 5 | 65 | "comparison examples. which"<br><br>should read:<br>"comparison examples, which" |
| 6 | 26 | "various components as well as"<br><br>should read:<br>"various components, as well as" |
| 6 | 23 | "specimen. '$\sigma$'. can be"<br><br>should read:<br>"specimen, '$\sigma$', can be" |
| 7 | 29 | "were prepared. molded"<br><br>should read:<br>"were prepared, molded" |

UNITED STATES PATENT AND TRADEMARK OFFICE
CERTIFICATE OF CORRECTION

PATENT NO. : 5,905,120
DATED : May 18, 1999
INVENTOR(S) : M. Jamal El-Hibri

It is certified that error appears in the above-indentified patent and that said Letters Patent is hereby corrected as shown below:

| Col. | Line | |
|---|---|---|
| 9 | 20 | "invention. Example 1," <br><br> should read: <br> "invention, Example 1," |
| 9 | 53 | "polyetherimides. see C-2 and C-4." <br><br> should read: <br> "polyetherimides, see C-2 and C-4," |

UNITED STATES PATENT AND TRADEMARK OFFICE
CERTIFICATE OF CORRECTION

PATENT NO. : 5,905,120
DATED : May 18, 1999
INVENTOR(S) : M. Jamal El-Hibri

It is certified that error appears in the above-indentified patent and that said Letters Patent is hereby corrected as shown below:

| Col. | line | |
|---|---|---|
| 9 | 63 | "annealing. at least" should read: "annealing, at least" |
| 10 | 1 | "resin. Example" should read: "resin, Example" |

Signed and Sealed this

Ninth Day of November, 1999

Attest:

Q. TODD DICKINSON

Attesting Officer

Acting Commissioner of Patents and Trademarks